US012614181B2

(12) United States Patent
Cao et al.

(10) Patent No.: US 12,614,181 B2
(45) Date of Patent: *Apr. 28, 2026

(54) SYSTEM, METHOD, AND COMPUTER PROGRAM PRODUCT FOR INTERPRETING BLACK BOX MODELS BY PERTURBING TRANSACTION PARAMETERS

(71) Applicant: Visa International Service Association, San Francisco, CA (US)

(72) Inventors: Shi Cao, Austin, TX (US); Chiranjeet Chetia, Round Rock, TX (US); Xi Kan, Austin, TX (US); Dan Wang, Cedar Park, TX (US)

(73) Assignee: Visa International Service Association, San Francisco, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/431,076

(22) Filed: Feb. 2, 2024

(65) Prior Publication Data

US 2024/0169352 A1 May 23, 2024

Related U.S. Application Data

(63) Continuation of application No. 18/014,822, filed as application No. PCT/US2022/037592 on Jul. 19, 2022, now Pat. No. 11,922,424.

(Continued)

(51) Int. Cl.
| | |
|---|---|
| *G06Q 40/00* | (2023.01) |
| *G06N 20/00* | (2019.01) |
| *G06Q 20/40* | (2012.01) |

(52) U.S. Cl.
CPC ......... *G06Q 20/4016* (2013.01); *G06N 20/00* (2019.01)

(58) Field of Classification Search
CPC .......................... G06Q 20/4016; G06N 20/00
See application file for complete search history.

(56) References Cited

U.S. PATENT DOCUMENTS

| | | | | |
|---|---|---|---|---|
| 10,430,795 B2 * | 10/2019 | Rao | ...................... | G06Q 20/409 |
| 10,855,726 B2 * | 12/2020 | Hu | .......................... | H04L 63/20 |

(Continued)

FOREIGN PATENT DOCUMENTS

| | | |
|---|---|---|
| CN | 110992042 A | 4/2020 |
| CN | 111242319 A | 6/2020 |

(Continued)

OTHER PUBLICATIONS

Ivanovs et al., Perturbation-based method for explaining deep neural networks: A survey, Pattern Recognition Letters, 150 (2021) 228-234, 2021 (Year: 2021).*

(Continued)

*Primary Examiner* — Hani M Kazimi
*Assistant Examiner* — William B. Bunker
(74) *Attorney, Agent, or Firm* — The Webb Law Firm

(57) ABSTRACT

A computer-implemented method includes: receiving an inquiry request message identifying a first payment transaction having a plurality of transaction parameters and a risk score, where the risk score is generated by a machine-learning model based on the plurality of transaction parameters; for each transaction parameter of the plurality of transaction parameters, perturbing a value of the transaction parameter and re-analyzing the first payment transaction with the machine-learning model to generate a perturbed risk score based on the perturbed transaction parameter; determining at least one impact parameter from the plurality of transaction parameters by comparing the perturbed risk scores generated for each of the plurality of transaction (Continued)

parameters; and generating an inquiry response message based on the at least one impact parameter.

20 Claims, 9 Drawing Sheets

Related U.S. Application Data

(60) Provisional application No. 63/319,814, filed on Mar. 15, 2022.

(56) References Cited

U.S. PATENT DOCUMENTS

| | | | |
|---|---|---|---|
| 10,902,065 B1* | 1/2021 | Merritt | G16H 10/40 |
| 2014/0200930 A1* | 7/2014 | Zizzamia | G16H 50/50 |
| | | | 705/4 |
| 2014/0279752 A1* | 9/2014 | Milana | G06N 5/00 |
| | | | 706/12 |
| 2014/0304158 A1* | 10/2014 | Basu | G06Q 20/4016 |
| | | | 705/44 |
| 2015/0066773 A1 | 3/2015 | Vedabrata | |
| 2016/0379133 A1* | 12/2016 | Shteingart | G06N 20/00 |
| | | | 706/12 |
| 2017/0109509 A1 | 4/2017 | Baghdasaryan | |
| 2017/0345007 A1* | 11/2017 | Matteson | G06Q 20/4097 |
| 2018/0101788 A1* | 4/2018 | He | G06N 7/01 |
| 2018/0144318 A1* | 5/2018 | Sharma | G06Q 20/4012 |
| 2018/0322406 A1 | 11/2018 | Merrill et al. | |
| 2019/0066105 A1* | 2/2019 | Banks Larsen | G06Q 20/229 |
| 2019/0122135 A1 | 4/2019 | Parker | |
| 2019/0147369 A1 | 5/2019 | Gupta et al. | |
| 2019/0156196 A1* | 5/2019 | Zoldi | G06N 3/08 |
| 2020/0110982 A1 | 4/2020 | Gou et al. | |
| 2020/0356882 A1 | 11/2020 | Antoine et al. | |
| 2020/0394542 A1* | 12/2020 | Buesser | G06F 18/29 |
| 2021/0004703 A1* | 1/2021 | Zoldi | G06Q 40/02 |
| 2021/0035235 A1* | 2/2021 | Zawadzki | G06Q 40/123 |
| 2021/0049503 A1* | 2/2021 | Nourian | G06F 11/3466 |
| 2021/0103838 A1 | 4/2021 | Yuan et al. | |
| 2021/0166151 A1* | 6/2021 | Kennel | G06N 20/00 |
| 2022/0114494 A1 | 4/2022 | Sousa et al. | |
| 2022/0122079 A1* | 4/2022 | Cohn | G06Q 20/108 |
| 2023/0111445 A1* | 4/2023 | Ranjan | G06Q 20/4016 |
| | | | 705/318 |

FOREIGN PATENT DOCUMENTS

| | | | | | |
|---|---|---|---|---|---|
| WO | WO-2016167544 A1 | * | 10/2016 | | G06Q 20/322 |
| WO | WO-2017003499 A1 | * | 1/2017 | | G06N 7/01 |
| WO | WO-2021220241 A1 | * | 11/2021 | | G06V 10/82 |
| WO | WO-2022058116 A1 | * | 3/2022 | | G06N 5/045 |

OTHER PUBLICATIONS

Fong et al., "Interpretable Explanations of Black Boxes by Meaningful Perturbation," Computer Vision Foundation, 3429-3437, 2017 (Year: 2017).*

Zimek et al., "Data Perturbation for Outlier Detection Ensembles," ACM 978-1-4503-2722-0/14/06, 2014 (Year: 2014).*

Arnold et al., "Stochastic parametrizations and model uncertainty in the Lorenz '96 system", Royal Society Publishing, 2013, pp. 1-22.

Fong et al., "Interpretable explanations of black boxes by meaningful perturbation", Computer Vision Foundation, 2017, pp. 3429-3437.

Ivanovs et al., "Perturbation-based method for explaining deep neural networks: A survey," Pattern Recognition Letters, 150, 2021, pp. 228-234.

Kuiper et al., "Exploring explainable AI in the financial sector: Perspectives of banks and supervisory authorities", 2021, retrieved from https://www.researchgate.net/publication/355809049_Exploring_Explainable_AI_in_the_Financial_Sector_Perspectives_of_Banks_and_Supervisory_Authorities, 16 pages.

Rudin, "Stop Explaining Black Box Machine Learning Models for High Stakes Decisions and Use Interpretable Models Instead", Nature Machine Intelligence, 2019, pp. 1-30.

Torrent et al., "PSD2 AI Explainable Model for Credit Scoring", article accessed at arXiv:2011.10367v3, 2011, pp. 1-15.

Zimek et al., "Data Perturbation for Outlier Detection Ensembles", ACM 978-1-4503-2722-0/14/06, 2014, pp. 1-12.

* cited by examiner

SYSTEM, METHOD, AND COMPUTER PROGRAM PRODUCT FOR INTERPRETING BLACK BOX MODELS BY PERTURBING TRANSACTION PARAMETERS

CROSS REFERENCE TO RELATED APPLICATIONS

This application is a continuation of U.S. patent application Ser. No. 18/014,822, filed Jul. 19, 2022, which is the United States national phase of International Application No. PCT/US2022/037592, filed Jul. 19, 2022, and claims priority to United U.S. Patent Application No. 63/319,814, filed on Mar. 15, 2022, the disclosures of which are incorporated by reference herein in their entireties.

BACKGROUND

1. Field

This disclosure relates generally to "black box" machine learning models and, in non-limiting embodiments or aspects, to systems, methods, and computer program products for interpreting black box machine learning models by perturbing transaction parameters.

2. Technical Considerations

"Black box" machine learning models are being introduced for use in connection with electronic payment transactions. However, due to the unknown (e.g., "black box") nature of the machine learning models, it is difficult to understand which aspects of the input data drive the decision (the output) of the model. This lack of transparency makes it difficult for users to monitor the model, understand or learn from the model, or justify its outcomes when challenged.

SUMMARY

According to non-limiting embodiments or aspects, provided is a computer-implemented method including: receiving, with at least one processor, an inquiry request message identifying a first payment transaction having a plurality of transaction parameters and a risk score, where the risk score is generated by a machine-learning model based on the plurality of transaction parameters; for each transaction parameter of the plurality of transaction parameters, perturbing, with at least one processor, a value of the transaction parameter and re-analyzing the first payment transaction with the machine-learning model to generate a perturbed risk score based on the perturbed transaction parameter; determining, with at least one processor, at least one impact parameter from the plurality of transaction parameters by comparing the perturbed risk scores generated for each of the plurality of transaction parameters; and generating, with at least one processor, an inquiry response message based on the at least one impact parameter.

In non-limiting embodiments or aspects, perturbing a value of the transaction parameter may include incrementing the value of the transaction parameter by an amount and/or a percent of the value, where the perturbed transaction parameter includes a numerical transaction parameter. Incrementing the value of the transaction parameter may include increasing or decreasing the value by up to 5% to form the perturbed transaction parameter. The perturbed transaction parameter may include a categorical transaction parameter, where perturbing a value of the categorical transaction parameter may include changing the category of the categorical transaction parameter from a first category to a second category. Re-analyzing the first payment transaction with the machine-learning model to generate a perturbed risk score based on the perturbed transaction parameter may be conducted with only a single transaction parameter of the plurality of transaction parameters perturbed at a time. The risk score may satisfy a threshold. The first payment transaction may include an authorization decision, where the authorization decision is a decline authorization decision based on the risk score. The authorization decision may have been generated by a transaction processing system of a transaction service provider acting on behalf of an issuer system of an issuer. The authorization decision may have been generated by the transaction processing system while the issuer system failed to communicate with a component of an electronic payment processing network. The authorization decision may have been generated by the transaction processing system by applying the plurality of transaction parameters to a black box machine-learning model, where the black box machine-learning model is generated based on modeling historical authorization decisions of the issuer system. The authorization decision may have been generated by the transaction processing system based on historical transaction data associated with a user initiating the first payment transaction. Determining the at least one impact parameter may include determining at least one transaction parameter from the plurality of transaction parameters which has a difference between the risk score and the corresponding perturbed risk score satisfying a threshold. The method may further include: displaying, on a user device, data associated with the first payment transaction and a selectable element associated with the data associated with the first payment transaction; receiving, by the user device, user input indicating selection of the selectable element; and in response to selection of the selectable element, generating and transmitting, by the user device, the inquiry request message.

According to non-limiting embodiments or aspects, provided is a system including at least one processor programmed or configured to: receive an inquiry request message identifying a first payment transaction having a plurality of transaction parameters and a risk score, where the risk score is generated by a machine-learning model based on the plurality of transaction parameters; for each transaction parameter of the plurality of transaction parameters, perturb a value of the transaction parameter and re-analyze the first payment transaction with the machine-learning model to generate a perturbed risk score based on the perturbed transaction parameter; determine at least one impact parameter from the plurality of transaction parameters by comparing the perturbed risk scores generated for each of the plurality of transaction parameters; and generate an inquiry response message based on the at least one impact parameter.

In non-limiting embodiments or aspects, perturbing a value of the transaction parameter may include incrementing the value of the transaction parameter by an amount and/or a percent of the value, where the perturbed transaction parameter includes a numerical transaction parameter. Incrementing the value of the transaction parameter may include increasing or decreasing the value by up to 5% to form the perturbed transaction parameter. The perturbed transaction parameter may include a categorical transaction parameter, where perturbing a value of the categorical transaction parameter includes changing the category of the categorical transaction parameter from a first category to a second category. Re-analyzing the first payment transaction with the machine-learning model to generate a perturbed risk score based on the perturbed transaction parameter may be conducted with only a single transaction parameter of the plurality of transaction parameters perturbed at a time. The risk score may satisfy a threshold. The first payment transaction may include an authorization decision, where the authorization decision is a decline authorization decision based on the risk score. The authorization decision may have been generated by a transaction processing system of a transaction service provider acting on behalf of an issuer system of an issuer. The authorization decision may have been generated by the transaction processing system while the issuer system failed to communicate with a component of an electronic payment processing network. The authorization decision may have been generated by the transaction processing system by applying the plurality of transaction parameters to a black box machine-learning model, where the black box machine-learning model is generated based on modeling historical authorization decisions of the issuer system. The authorization decision may have been generated by the transaction processing system based on historical transaction data associated with a user initiating the first payment transaction. Determining the at least one impact parameter may include determining at least one transaction parameter from the plurality of transaction parameters which has a difference between the risk score and the corresponding perturbed risk score satisfying a threshold. The system may include a user device programmed or configured to: display data associated with the first payment transaction and a selectable element associated with the data associated with the first payment transaction; receive user input indicating selection of the selectable element; and in response to selection of the selectable element, generate and transmit the inquiry request message.

According to non-limiting embodiments or aspects, provided is a computer program product including at least one non-transitory computer-readable medium including program instructions that, when executed by at least one processor, cause the at least one processor to: receive an inquiry request message identifying a first payment transaction having a plurality of transaction parameters and a risk score, where the risk score is generated by a machine-learning model based on the plurality of transaction parameters; for each transaction parameter of the plurality of transaction parameters, perturb a value of the transaction parameter and re-analyze the first payment transaction with the machine-learning model to generate a perturbed risk score based on the perturbed transaction parameter; determine at least one impact parameter from the plurality of transaction parameters by comparing the perturbed risk scores generated for each of the plurality of transaction parameters; and generate an inquiry response message based on the at least one impact parameter.

In non-limiting embodiments or aspects, perturbing a value of the transaction parameter may include incrementing the value of the transaction parameter by an amount and/or a percent of the value, where the perturbed transaction parameter includes a numerical transaction parameter. Incrementing the value of the transaction parameter may include increasing or decreasing the value by up to 5% to form the perturbed transaction parameter. The perturbed transaction parameter may include a categorical transaction parameter, where perturbing a value of the categorical transaction parameter includes changing the category of the categorical transaction parameter from a first category to a second category. Re-analyzing the first payment transaction with the machine-learning model to generate a perturbed risk score based on the perturbed transaction parameter may be conducted with only a single transaction parameter of the plurality of transaction parameters perturbed at a time. The risk score may satisfy a threshold. The first payment transaction may include an authorization decision, where the authorization decision is a decline authorization decision based on the risk score. The authorization decision may have been generated by a transaction processing system of a transaction service provider acting on behalf of an issuer system of an issuer. The authorization decision may have been generated by the transaction processing system while the issuer system failed to communicate with a component of an electronic payment processing network. The authorization decision may have been generated by the transaction processing system by applying the plurality of transaction parameters to a black box machine-learning model, where the black box machine-learning model is generated based on modeling historical authorization decisions of the issuer system. The authorization decision may have been generated by the transaction processing system based on historical transaction data associated with a user initiating the first payment transaction. Determining the at least one impact parameter may include determining at least one transaction parameter from the plurality of transaction parameters which has a difference between the risk score and the corresponding perturbed risk score satisfying a threshold. The program instructions, when executed by a user device, may cause the user device to: display data associated with the first payment transaction and a selectable element associated with the data associated with the first payment transaction; receive user input indicating selection of the selectable element; and in response to selection of the selectable element, generate and transmit the inquiry request message.

Other non-limiting embodiments or aspects will be set forth in the following numbered clauses:

Clause 1: A computer-implemented method comprising: receiving, with at least one processor, an inquiry request message identifying a first payment transaction having a plurality of transaction parameters and a risk score, wherein the risk score is generated by a machine-learning model based on the plurality of transaction parameters; for each transaction parameter of the plurality of transaction parameters, perturbing, with at least one processor, a value of the transaction parameter and re-analyzing the first payment transaction with the machine-learning model to generate a perturbed risk score based on the perturbed transaction parameter; determining, with at least one processor, at least one impact parameter from the plurality of transaction parameters by comparing the perturbed risk scores generated for each of the plurality of transaction parameters; and generating, with at least one processor, an inquiry response message based on the at least one impact parameter.

Clause 2: The method of clause 1, wherein perturbing a value of the transaction parameter comprises incrementing the value of the transaction parameter by an amount and/or a percent of the value, wherein the perturbed transaction parameter comprises a numerical transaction parameter.

Clause 3: The method of clause 1 or 2, wherein incrementing the value of the transaction parameter comprises increasing or decreasing the value by up to 5% to form the perturbed transaction parameter.

Clause 4: The method of any of clauses 1-3, wherein the perturbed transaction parameter comprises a categorical transaction parameter, wherein perturbing a value of the categorical transaction parameter comprises changing the category of the categorical transaction parameter from a first category to a second category.

Clause 5: The method of any of clauses 1-4, wherein re-analyzing the first payment transaction with the machine-learning model to generate a perturbed risk score based on the perturbed transaction parameter is conducted with only a single transaction parameter of the plurality of transaction parameters perturbed at a time.

Clause 6: The method of any of clauses 1-5, wherein the risk score satisfies a threshold.

Clause 7: The method of any of clauses 1-6, wherein the first payment transaction comprises an authorization decision, wherein the authorization decision is a decline authorization decision based on the risk score.

Clause 8: The method of any of clauses 1-7, wherein the authorization decision was generated by a transaction processing system of a transaction service provider acting on behalf of an issuer system of an issuer.

Clause 9: The method of any of clauses 1-8, wherein the authorization decision was generated by the transaction processing system while the issuer system failed to communicate with a component of an electronic payment processing network.

Clause 10: The method of any of clauses 1-9, wherein the authorization decision was generated by the transaction processing system by applying the plurality of transaction parameters to a black box machine-learning model, wherein the black box machine-learning model is generated based on modeling historical authorization decisions of the issuer system.

Clause 11: The method of any of clauses 1-10, wherein the authorization decision was generated by the transaction processing system based on historical transaction data associated with a user initiating the first payment transaction.

Clause 12: The method of any of clauses 1-11, wherein determining the at least one impact parameter comprises determining at least one transaction parameter from the plurality of transaction parameters which has a difference between the risk score and the corresponding perturbed risk score satisfying a threshold.

Clause 13: The method of any of clauses 1-12, comprising: displaying, on a user device, data associated with the first payment transaction and a selectable element associated with the data associated with the first payment transaction; receiving, by the user device, user input indicating selection of the selectable element; and in response to selection of the selectable element, generating and transmitting, by the user device, the inquiry request message.

Clause 14: A system comprising at least one processor programmed or configured to: receive an inquiry request message identifying a first payment transaction having a plurality of transaction parameters and a risk score, wherein the risk score is generated by a machine-learning model based on the plurality of transaction parameters; for each transaction parameter of the plurality of transaction parameters, perturb a value of the transaction parameter and re-analyze the first payment transaction with the machine-learning model to generate a perturbed risk score based on the perturbed transaction parameter; determine at least one impact parameter from the plurality of transaction parameters by comparing the perturbed risk scores generated for each of the plurality of transaction parameters; and generate an inquiry response message based on the at least one impact parameter.

Clause 15: The system of clause 14, wherein perturbing a value of the transaction parameter comprises incrementing the value of the transaction parameter by an amount and/or a percent of the value, wherein the perturbed transaction parameter comprises a numerical transaction parameter.

Clause 16: The system of clause 14 or 15, wherein incrementing the value of the transaction parameter comprises increasing or decreasing the value by up to 5% to form the perturbed transaction parameter.

Clause 17: The system of any of clauses 14-16, wherein the perturbed transaction parameter comprises a categorical transaction parameter, wherein perturbing a value of the categorical transaction parameter comprises changing the category of the categorical transaction parameter from a first category to a second category.

Clause 18: The system of any of clauses 14-17, wherein re-analyzing the first payment transaction with the machine-learning model to generate a perturbed risk score based on the perturbed transaction parameter is conducted with only a single transaction parameter of the plurality of transaction parameters perturbed at a time.

Clause 19: The system of any of clauses 14-18, wherein the risk score satisfies a threshold.

Clause 20: The system of any of clauses 14-19, wherein the first payment transaction comprises an authorization decision, wherein the authorization decision is a decline authorization decision based on the risk score.

Clause 21: The system of any of clauses 14-20, wherein the authorization decision was generated by a transaction processing system of a transaction service provider acting on behalf of an issuer system of an issuer.

Clause 22: The system of any of clauses 14-21, wherein the authorization decision was generated by the transaction processing system while the issuer system failed to communicate with a component of an electronic payment processing network.

Clause 23: The system of any of clauses 14-22, wherein the authorization decision was generated by the transaction processing system by applying the plurality of transaction parameters to a black box machine-learning model, wherein the black box machine-learning model is generated based on modeling historical authorization decisions of the issuer system.

Clause 24: The system of any of clauses 14-23, wherein the authorization decision was generated by the transaction processing system based on historical transaction data associated with a user initiating the first payment transaction.

Clause 25: The system of any of clauses 14-24, wherein determining the at least one impact parameter comprises determining at least one transaction parameter from the plurality of transaction parameters which has a difference between the risk score and the corresponding perturbed risk score satisfying a threshold.

Clause 26: The system of any of clauses 14-25, comprising a user device programmed or configured to: display data associated with the first payment transaction and a selectable element associated with the data associated with the first payment transaction; receive user input indicating selection of the selectable element; and in response to selection of the selectable element, generate and transmit the inquiry request message.

Clause 27: A computer program product comprising at least one non-transitory computer-readable medium including program instructions that, when executed by at least one processor, cause the at least one processor to: receive an inquiry request message identifying a first payment transaction having a plurality of transaction parameters and a risk score, wherein the risk score is generated by a machine-learning model based on the plurality of transaction parameters; for each transaction parameter of the plurality of transaction parameters, perturb a value of the transaction parameter and re-analyze the first payment transaction with the machine-learning model to generate a perturbed risk score based on the perturbed transaction parameter; determine at least one impact parameter from the plurality of transaction parameters by comparing the perturbed risk scores generated for each of the plurality of transaction parameters; and generate an inquiry response message based on the at least one impact parameter.

Clause 28: The computer program product of clause 27, wherein perturbing a value of the transaction parameter comprises incrementing the value of the transaction parameter by an amount and/or a percent of the value, wherein the perturbed transaction parameter comprises a numerical transaction parameter.

Clause 29: The computer program product of clause 27 or 28, wherein incrementing the value of the transaction parameter comprises increasing or decreasing the value by up to 5% to form the perturbed transaction parameter.

Clause 30: The computer program product of any of clauses 27-29, wherein the perturbed transaction parameter comprises a categorical transaction parameter, wherein perturbing a value of the categorical transaction parameter comprises changing the category of the categorical transaction parameter from a first category to a second category.

Clause 31: The computer program product of any of clauses 27-30, wherein re-analyzing the first payment transaction with the machine-learning model to generate a perturbed risk score based on the perturbed transaction parameter is conducted with only a single transaction parameter of the plurality of transaction parameters perturbed at a time.

Clause 32: The computer program product of any of clauses 27-31, wherein the risk score satisfies a threshold.

Clause 33: The computer program product of any of clauses 27-32, wherein the first payment transaction comprises an authorization decision, wherein the authorization decision is a decline authorization decision based on the risk score.

Clause 34: The computer program product of any of clauses 27-33, wherein the authorization decision was generated by a transaction processing system of a transaction service provider acting on behalf of an issuer system of an issuer.

Clause 35: The computer program product of any of clauses 27-34, wherein the authorization decision was generated by the transaction processing system while the issuer system failed to communicate with a component of an electronic payment processing network.

Clause 36: The computer program product of any of clauses 27-35, wherein the authorization decision was generated by the transaction processing system by applying the plurality of transaction parameters to a black box machine-learning model, wherein the black box machine-learning model is generated based on modeling historical authorization decisions of the issuer system.

Clause 37: The computer program product of any of clauses 27-36, wherein the authorization decision was generated by the transaction processing system based on historical transaction data associated with a user initiating the first payment transaction.

Clause 38: The computer program product of any of clauses 27-37, wherein determining the at least one impact parameter comprises determining at least one transaction parameter from the plurality of transaction parameters which has a difference between the risk score and the corresponding perturbed risk score satisfying a threshold.

Clause 39: The computer program product of any of clauses 27-38, wherein the program instructions, when executed by a user device, cause the user device to: display data associated with the first payment transaction and a selectable element associated with the data associated with the first payment transaction; receive user input indicating selection of the selectable element; and in response to selection of the selectable element, generate and transmit the inquiry request message.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
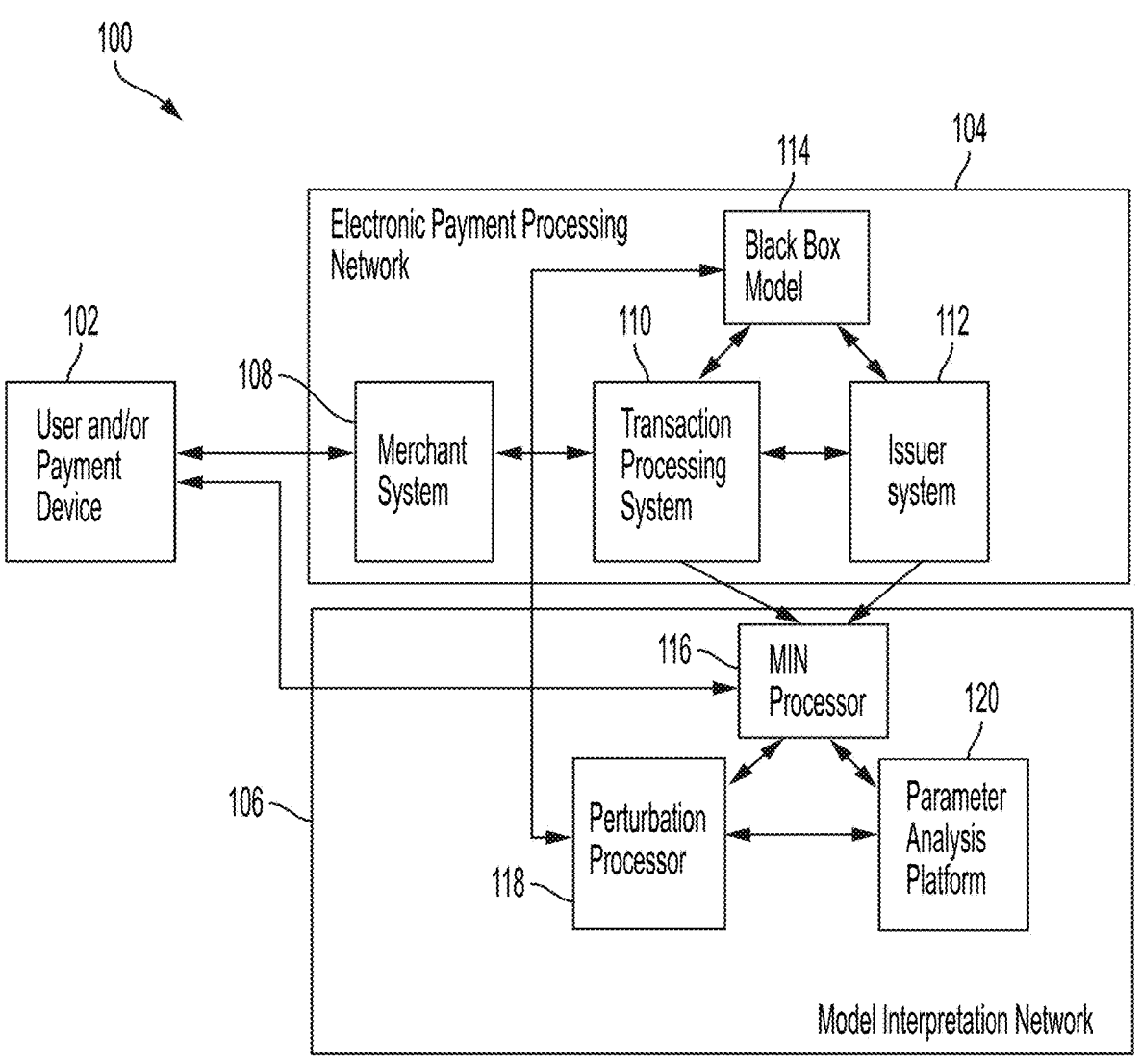
FIG. 1 shows a schematic diagram of a system for interpreting black box models by perturbing transaction parameters according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "account identifier" may include one or more primary account numbers (PAN), tokens, or other identifiers associated with a customer account. For example, account identifiers in Real Time Payment (RTP) transactions may include identifiers for sender accounts (called debtor accounts) and identifiers for receiver accounts (called creditor accounts). Account identifiers may be alphanumeric or any combination of characters and/or symbols. Tokens may be associated with a PAN, debtor account identifier, creditor account identifier, or other original account identifier in one or more data structures (e.g., one or more databases, and/or the like) such that they may be used to conduct a transaction without directly using the original account identifier. In some examples, an original account identifier may be associated with a plurality of tokens for different individuals or purposes.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" or "user device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer, server computer, or other form of non-mobile computer.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a PAN, to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, a radio frequency identification (RFID) transponder, a retailer discount or loyalty card, and/or the like. The payment device may include a volatile or a non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, RFID receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

The term "processor," as used herein, may represent any type of processing unit, such as a single processor having one or more cores, one or more cores of one or more processors, multiple processors each having one or more cores, and/or other arrangements and combinations of processing units. Reference to "at least one processor" can refer to a previously-recited processor or a different processor.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices such as, but not limited to, processors, servers, client devices, software applications, and/or other like components.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects described herein relate to systems, methods, and computer program products for interpreting black box models for payment transactions that improve upon existing electronic payment systems. A problem arising specifically in the realm of black box machine learning models is the lack of transparency of such models in providing the reasoning behind their decisions to the user. Commonly, only the input parameters and the output decision are known. Non-limiting embodiments or aspects automatically interpret a decision generated by a black box machine learning model and associated with a payment transaction (such as an authorization decision), in order to enhance transparency of the model. Non-limiting embodiments or aspects also enable users to monitor the model (to remedy any potential model errors), understand or learn from the model, and/or justify its payment transaction decision outcomes generated by the model, if challenged. Further, by enhancing the transparency of the model, modifications to payment processes may be made to reduce the amount of computational resources needed to perform such processes.

Non-limiting embodiments or aspects efficiently interpret the payment transaction decision by receiving only the payment transaction in question as the input, as opposed to requiring an entire sample dataset as input in order to analyze the payment transaction. This is done by perturbing the transaction parameters of the transaction in question so as to focus on the local environment immediately surrounding the transaction in question. The perturbed transaction parameters may be input into the black box model to analyze the perturbed transaction parameters, and the output of the black box model from the perturbed transaction parameters may be compared to the output of the black box model from the original transaction parameters. This comparison may be used to determine an impact parameter which may be causing the generation of the payment transaction decision and/or causing the payment transaction to be an outlier relative to other historical payment transactions. Non-limiting embodiments or aspects may generate an interpretable reason for the payment transaction decision based on the impact parameter, in order to enhance transparency associated with the decisions generated by the black box model. Therefore, the system, method, and computer program product described herein enhances transparency of the black box machine learning model, enables user monitoring of the model allowing for remediation of errors, enables understanding or learning to be gleaned from the model, enables interpretable justification of the model's decisions, and/or improves upon existing payment processes while doing so in an efficient way that reduces the computing resources necessary for generating model interpretations.

FIG. 1 depicts a system 100 for interpreting "black box" models for payment transaction decisions according to non-limiting embodiments or aspects. As used herein, the terms "black box model" and "black box machine learning model" refer to a model that receives an input and generates an output based on the input and one or more processes unknown to an end-user. As used herein, a "payment transaction decision" refers to a determination made in connection with the processing of an electronic payment transaction (e.g., a credit or debit card transaction), such as a payment authorization decision, a generated risk score, a fraud determination, and the like. The system 100 may include a user device and/or payment device 102 (hereinafter referred to as user device 102) of a user engaging in electronic payment transactions with various merchants. The user device and payment device may be the same device or may be separate devices. The user device 102 may be used in conjunction with an electronic payment processing network 104 and/or a model interpretation network 106, also components of the system 100.

The electronic payment processing network 104 may comprise a merchant system 108 associated with a merchant engaging in an electronic payment transaction with the user and a transaction processing system 110 and an issuer system 112 associated with the transaction service provider and issuer, respectively, associated with the user's payment device. The electronic payment processing network 104 may comprise a black box model 114. The model interpretation network 106 may comprise a model interpretation network (MIN) processor 116, a perturbation processor 118, and a parameter analysis platform 120.

With continued reference to FIG. 1, in some non-limiting embodiments or aspects, the user device 102 may engage with the electronic payment processing network 104 to process an electronic payment transaction between the user and a merchant to completion. This includes authorizing, clearing, and settling the electronic payment transaction. The user device 102 may communicate with the merchant system 108 associated with the merchant to initiate the electronic payment transaction. The merchant system 108 may communicate over the electronic payment processing network 104 with the transaction processing system 110 and the issuer system 112 associated with the transaction service provider and issuer, respectively, of the user's payment device to process the electronic payment transaction. This includes generating at least one payment transaction decision.

The payment transaction decision (e.g., an authorization decision, risk score, and/or fraud determination) may be generated by the issuer system 112. However, in some non-limiting embodiments or aspects, the transaction processing system 110 may "stand-in" for the issuer system 112 to generate the payment transaction decision (e.g., Stand in Processing (STIP)). The transaction processing system 110 may stand-in to generate the payment transaction decision in an instance in which the issuer system 112 and/or the transaction processing system 110 is/are unable to communicate with other components in the electronic payment processing network 104. For example, the issuer system 112 may have temporarily lost connection, such that it failed to communicate with the transaction processing system 110 and/or other components of the electronic payment processing network 104, such that the transaction processing system 110 generates the payment transaction decision on behalf of the issuer system 112 so that the payment transaction does not automatically fail.

With continued reference to FIG. 1, the issuer system 112 or the transaction processing system 110 generating the payment transaction decision may generate the payment transaction decision using the black box model 114. The black box model 114 may be trained to generate payment transaction decisions using historical transaction data and machine learning techniques. The black box model 114 may use historical transaction data as well as transaction data associated with the instant payment transaction as input to generate the payment transaction decision. The black box model 114 may use historical transaction data globally (of all users) and historical transaction data for the specific user initiating instant transaction. The historical transaction data for the specific user initiating the instant transaction may, in some embodiments or aspects, be weighted more heavily by the black box model 114 for the instant transaction, due to its increased relevance for the specific user. The black box model 114 may generate a payment transaction decision without generating a human interpretable reason for the generated payment transaction decision. In some examples, the black box model may return the payment transaction decision without providing the reason behind that decision. The payment transaction decision may be generated for the payment transaction during the check-out procedure of the payment transaction (e.g., at the time of the user engaging with the point-of-sale system).

For embodiments in which the transaction processing system 110 is generating the authorization decision on behalf of the issuer system 112 (STIP), the authorization decision may be generated by the transaction processing system 110 by applying the plurality of transaction parameters to a black box machine-learning model (separate or the same as black box model 114). This black box model may be generated by training the model using historical authorization decisions of the issuer system 112 so that the transaction processing system 110 mimics, to the extent possible, the authorization decision that would have been made by the issuer system 112 had the issuer system 112 been available to generate an authorization decision.

The payment transaction decision may be communicated to the user device 102. For example, the user device 102 may display data associated with the electronic payment transaction, including data associated with the payment transaction decision. The user device 102 may also display a selectable element associated with the data of the electronic payment transaction, with which the user may engage on the user interface of the user device 102.

With continued reference to FIG. 1, in some non-limiting embodiments or aspects, the model interpretation network 106 may be engaged in order to interpret the payment transaction decision of the black box model 114 for the electronic payment transaction. To engage the model interpretation network 106, the user may select the selectable element associated with the data of the electronic payment transaction on the user interface of the user device 102 to cause the user device 102 to generate an inquiry request message. The inquiry request message may also be generated in response to other inputs or events. The user device 102 may communicate the inquiry request message to the model interpretation network (MIN) processor 116 to initiate interpretation of the payment transaction decision of the black box model 114 for the electronic payment transaction. Additionally or alternatively, in some non-limiting embodiments or aspects, the transaction processing system 110, the issuer system 112, or some other system of the electronic payment processing network 104 may generate and transmit the inquiry request message to the MIN processor 116 to initiate interpretation of the payment transaction decision of the black box model 114 for the electronic payment transaction.

The inquiry request may identify the payment transaction and/or comprise transaction data associated with the payment transaction. The transaction data may comprise a plurality of transaction parameters having associated values. The transaction parameters may be those specified as a data element in ISO 8583, data elements derived from those specified in ISO 8583, or any other data associated with the payment transaction. The transaction data may comprise a risk score generated as the payment transaction decision during processing of the payment transaction. The risk score may be a numerical value indicating a risk associated with the payment transaction, with the numerical value indicating a relative level of risk associated with the payment transaction. The risk score may be a categorical value (e.g., authorized/declined; fraudulent/non-fraudulent) indicating a relative level of risk associated with the payment transaction. The risk score may have been generated by the black box model 114 based on the plurality of transaction parameters for the payment transaction.

The risk score for the payment transaction may satisfy a threshold, indicating that the payment transaction is an outlier. The threshold may be determined based on a statistic (e.g., mean, median, mode) associated with historical payment transactions identified as being "normal" (also referred to as a "non-outlier"). For example, a normal historical payment transaction may have a median or average risk score having a first value, and the threshold may be determined to be an amount or a percent above or below the median or average risk score. For example, if the average risk score is 50 (out of 100), the threshold may be selected to be at least 50% higher than the average risk score (i.e., at least 75), such that payment transactions having a risk score of 75-100 are considered "outlier" payment transactions. The risk score satisfying (e.g., exceeding) the threshold and/or being an outlier may automatically trigger interpretation of the model decision for the payment transaction.

In response to receiving the inquiry request message, the MIN processor 116 may communicate the transaction data associated with the payment transaction to the perturbation processor 118. For each of the plurality of transaction parameters, the perturbation processor 118 may perturb the value of the transaction parameter and re-analyze the payment transaction with the black box model 114 to generate a perturbed risk score based on the perturbed transaction parameter.

Perturbing the transaction parameter may comprise incrementing the value of the transaction parameter by an amount and/or a percent of the value, wherein the perturbed transaction parameter comprises a numerical transaction parameter. For example, the value of the transaction parameter may be perturbed by up to 10%, such as up to 5%, such as up to 2.5%, such as up to 1%. A numerical transaction parameter may be a parameter having a numerical value in which the numerical value is associated with an amount associated with the parameter. Non-limiting examples of numerical transaction parameters include, but are not limited to, transaction amount, transaction count over a time period (e.g., number of daily transactions), average user transaction amount, average user transaction count over a time period, and the like.

Perturbing the transaction parameter may comprise changing the category of the categorical transaction parameter from a first category to a second category, wherein transaction parameter comprises a categorical transaction parameter. A categorical parameter may be a parameter in which the value of the parameter designates the category to which the value is associated (e.g., card present or card not present transaction). A categorical parameter may have a numerical value associated with it, but that numerical value may not be associated with an amount associated with the parameter (e.g., the number of a merchant category code refers to a category of goods or services of the merchant and not an amount, the date or time of the transaction, and the like). Non-limiting examples of categorical transaction parameters include, but are not limited to, merchant category code, transaction type (e.g., card present or card not present), transaction date, and the like.

Re-analyzing the payment transaction may comprise including the transaction data for the payment transaction in the machine learning model except replacing the value of the transaction parameter that has been perturbed with the perturbed transaction parameter value to generate the perturbed risk score. At least one perturbed risk score may be generated for each transaction parameter by re-modeling the payment transaction for each perturbed transaction parameter value. This may be done by perturbing only a single transaction parameter of the plurality of transaction parameters at a time, in order to understand each transaction parameter's individual effect on the risk score (the payment transaction decision). In some non-limiting embodiments or aspects, a combination of transaction parameters may be perturbed at a time, in order to understand that combination's effect on the risk score. These perturbation techniques enable the model to focus on the local environment of the specific payment transaction by perturbing around the values of the specific payment transaction. It further enables the re-modeling to occur with the only input required being the relevant transaction data associated with the specific payment transaction, as opposed to requiring a larger sample size of data be submitted for re-modeling.

With continued reference to FIG. 1, in some non-limiting embodiments or aspects, the output of the perturbation processor 118 (the perturbed risk scores for each transaction parameter) may comprise the input to the parameter analysis platform 120. The parameter analysis platform 120 may analyze the perturbed risk scores to determine at least one impact parameter of the plurality of transaction parameters of the electronic payment transaction by comparing the perturbed risk scores generated for each of the plurality of transaction parameters. The at least one impact parameter may be a parameter which at least partially caused generation of the payment transaction decision of the electronic payment transaction to be an outlier. The at least one impact parameter may be determined to have at least partially caused generation of the payment transaction decision of the electronic payment transaction to be an outlier when an algorithm generated by the parameter analysis platform 120 associates the at least one impact parameter with a weight satisfying a threshold (e.g., that the parameter had an impact on the payment transaction decision and was significant enough to satisfy a threshold). The at least one impact parameter may be a single transaction parameter, a combination of transaction parameters, and/or a composite parameter derived from at least one transaction parameter. Determining the at least one impact parameter may comprise determining by the parameter analysis platform 120 that at least one transaction parameter from the plurality of transaction parameters caused a difference (by an amount or percent relative to the initial risk score) between the risk score and the corresponding perturbed risk score to be above a threshold. Determining the at least one impact parameter may comprise determining by the parameter analysis platform 120 the transaction parameter(s) from the plurality of transaction parameters having the largest difference (by an amount or percent relative to the initial risk score) between the risk score and the corresponding perturbed risk score, such as identifying the 5, 3, or 1 most impactful transaction parameter(s), based on the quantified difference values.

With continued reference to FIG. 1, in some non-limiting embodiments or aspects, the MIN processor 116 may generate an inquiry response message based on the at least one impact parameter. The inquiry response message may comprise at least one interpretable reason for the payment transaction decision of the electronic payment transaction, which interpretable reason(s) may be understood by the user. The interpretable reason may comprise an identification of the impact parameter(s). The model interpretation network 106 may automatically associate determined impact parameters with interpretable reasons so as to make the payment transaction decision of the black box model 114 more transparent for the user. The MIN processor 116 may transmit the inquiry response message to the device which communicated the inquiry request message (e.g., the user device 102, the transaction processing system 110, the issuer system 112, and the like). In some examples, the interpretable reason(s) may include, or may be used to automatically generate, one or more modified payment processes or suggestions for modifying a payment process to improve a positive authorization rate of future transactions.

According to some non-limiting embodiments or aspects, the payment transaction decision may comprise an authorization decision, which decision was to decline the payment transaction based on the risk score, and the transaction parameter(s) causing the decline authorization decision by the black box model 114 may be interpreted according to methods, systems, and computer program products consistent with the present disclosure.

According to some non-limiting embodiments or aspects, the payment transaction decision may comprise a fraud decision, which decision was to label the payment transaction as fraudulent based on the risk score, and the transaction parameter(s) causing the fraud determination by the black box model 114 may be interpreted according to methods, systems, and computer program products consistent with the present disclosure.

According to some non-limiting embodiments or aspects, the payment transaction decision may comprise a risk score classified as an outlier, and the transaction parameter(s) causing the outlier risk score by the black box model 114 may be interpreted according to methods, systems, and computer program products consistent with the present disclosure.

The number and arrangement of systems and devices shown in FIG. 1 are provided as an example. There may be additional systems and/or devices, fewer systems and/or devices, different systems and/or devices, and/or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Although the system, method, and computer program product has been described herein primarily with respect to transactions/transaction parameters, it will be appreciated that the system, method, and computer program product may be applied to any type of black box machine learning model that receives any type of input parameters that can be perturbed.

In some non-limiting embodiment or aspects, a computer program product includes at least one non-transitory computer readable medium including program instructions that, when executed by at least one processor, cause the at least one processor to execute one of the previously-described methods. The at least one processor may include any of the components shown in FIG. 1 (e.g., user device 102, electronic payment processing network 104, model interpretation network 106, merchant system 108, transaction processing system 110, issuer system 112, black box model 114, MIN processor 116, perturbation processor 118, or parameter analysis platform 120, and the like).

Referring to FIGS. 2-8, a non-limiting example of a process for interpreting black box models for perturbing transaction parameters is shown and described in the context of electronic payment transactions.

Figures 2, 3:
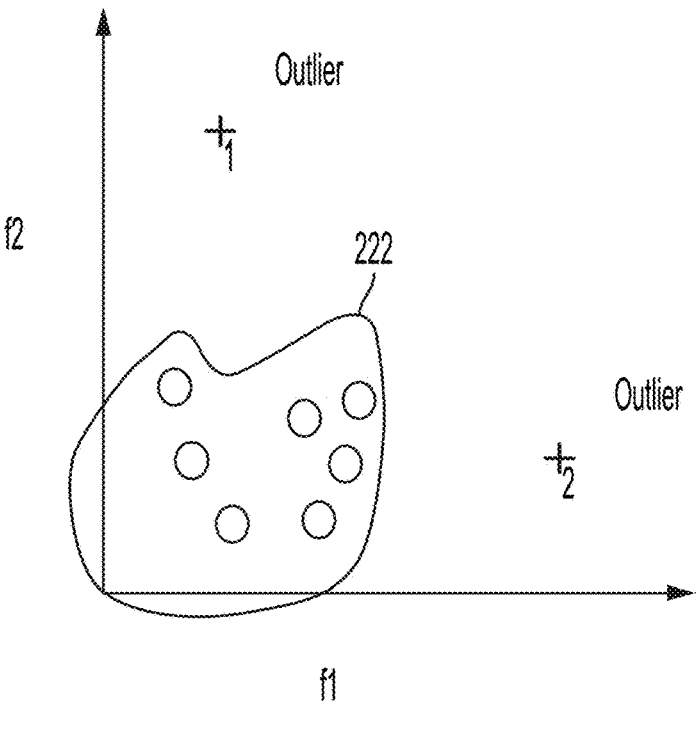
FIG. 2 shows a graph of outlier transactions according to some non-limiting embodiments or aspects.
FIG. 3 shows a graph of perturbed outlier transactions according to some non-limiting embodiments or aspects.

Referring to FIG. 2, a graph shows outlier transactions according to some non-limiting embodiments or aspects. In the graph of FIG. 2, each data point (denoted by a circle or plus sign) represents a payment transaction, and each data point's arrangement on the graph quantifies the risk score generated by the black box model 114 for that payment transaction. The risk score may be a numerical value indicating a risk associated with the payment transaction, with the numerical value indicating a relative level of risk associated with the payment transaction and/or the risk score may be a categorical value (e.g., authorized/declined; fraudulent/non-fraudulent) indicating a relative level of risk associated with the payment transaction.

In the non-limiting example shown in FIG. 2, the graph includes a non-outlier region 222 containing a plurality of payment transactions identified by the black box model 114 as not outliers. The graph also contains two payment transactions identified by the black box model 114 as being outliers +1, +2. The outliers +1, +2 may be identified as outliers relative to the other payment transactions due to their risk scores satisfying a threshold. These outliers +1, +2 may be the subject of the previously described inquiry request message, in order to determine an interpretable reason for the payment transaction decision (e.g., the outlier risk score).

Referring to FIG. 3, a graph shows perturbed outlier transactions according to some non-limiting embodiments or aspects. The graph from FIG. 3 is identical to the graph from FIG. 2 except as described hereinafter. In the graph of FIG. 3, outliers +1, +2, are each perturbed in the vicinity around the outliers +1, +2. The perturbation 324 of the outliers +1, +2 is represented in the graph of FIG. 3 by the plus signs surrounding each of the outliers +1, +2. Each of the perturbations 324 of the outliers +1, +2 may perturb a single transaction parameter by incrementing the value of the transaction parameter by an amount and/or a percent of the value, such as by up to 10%, such as up to 5%, such as up to 2.5%, such as up to 1%. The outliers +1, +2 may be perturbed only a single transaction parameter of the plurality of transaction parameters at a time, such that each outlier +1, +2 is perturbed a plurality of times, in order to understand each transaction parameter's individual effect on the risk score (e.g., the payment transaction decision) for the outliers +1, +2.

Figure 4:
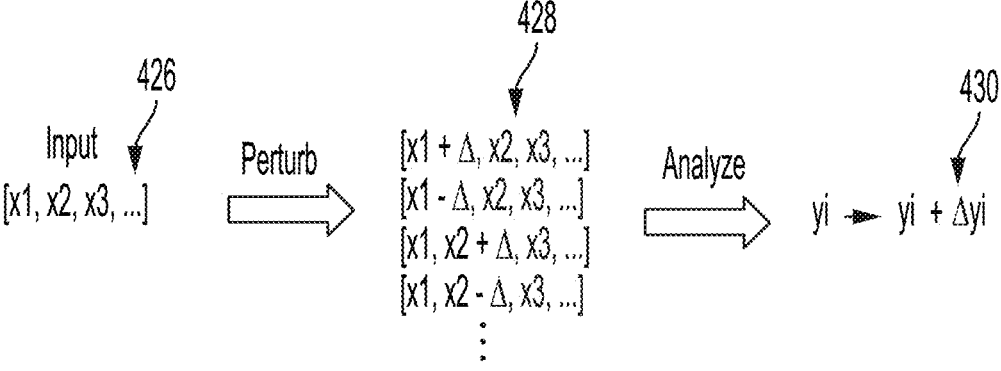
FIG. 4 shows a schematic diagram of a process of perturbing a numerical transaction parameter according to some non-limiting embodiments or aspects.

Referring to FIG. 4, a schematic diagram shows a process of perturbing a numerical transaction parameter according to some non-limiting embodiments or aspects. The process shown includes perturbing only a single transaction parameter of the plurality of transaction parameters at a time. In FIG. 4, the process includes input values 426 [x1, x2, x3], each of the input values representing a numerical transaction parameter. The process may include perturbing the input values 426 a single transaction parameter at a time to generate a plurality of perturbed values 428. This is shown in the example from FIG. 4 by first perturbing transaction parameter x1 by $+/-\Delta$ in the first two perturbed values 428 and perturbing transaction parameter x2 by $+/-\Delta$ in the second two perturbed values 428. The perturbed values 428 may be input into the black box model 114 to analyze how each perturbation affects the risk score by analyzing the perturbed output 430. The perturbed output 430 compares the original risk score $y_i$ with the sum of the original risk score plus the change in the original risk score $\Delta y_i$ caused by the perturbed value 428 being analyzed by the black box model 114. The smaller the change in the original risk score $\Delta y_i$, the smaller the effect the perturbation of the perturbed transaction parameter has on the risk score in the instant environment of that outlier +1, +2. The larger the change in the original risk score $\Delta y_i$, the larger the effect the perturbation of the perturbed transaction parameter has on the risk score in the instant environment of that outlier +1, +2. The perturbation of the transaction parameter by a $\Delta$ (an amount) may be performed for numerical transaction parameters, which may be parameters having a numerical value in which the numerical value is associated with an amount associated with the parameter.

Figure 5:
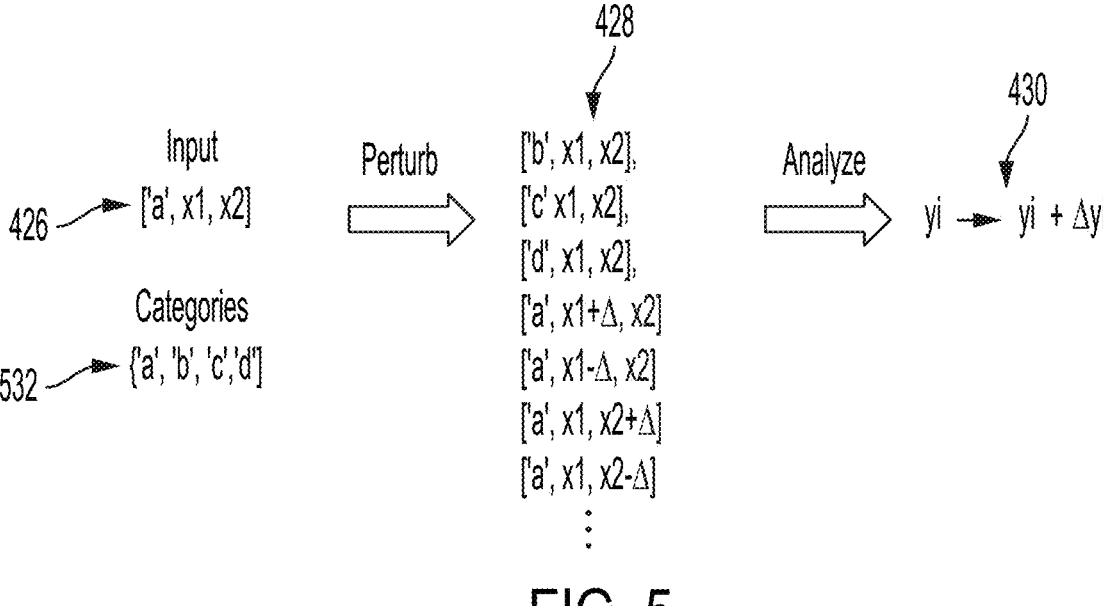
FIG. 5 shows a schematic diagram of a process of perturbing a categorical transaction parameter according to some non-limiting embodiments or aspects.

Referring to FIG. 5, a schematic diagram shows a process of perturbing a categorical transaction parameter according to some non-limiting embodiments or aspects. The process shown includes perturbing only a single transaction parameter of the plurality of transaction parameters at a time. In FIG. 5, the process includes input values 426 ['a', x1, x2], each of the input values representing a transaction parameter. While x1 and x2 are numerical transaction parameters as previously described, 'a' is a categorical transaction parameter in which the value of the parameter designates the category to which the value is associated. In the example of FIG. 5, the category options 532 for the first transaction parameter are ['a', 'b', 'c', 'd']. The process may include perturbing the input values 426 a single transaction parameter at a time to generate a plurality of perturbed values 428. This is shown in the example from FIG. 5 by first perturbing transaction parameter 'a' one category at a time (using 'b', 'c', and 'd') in the first three perturbed values 428, perturbing transaction parameter x1 by +/−$\Delta$ in the fourth and fifth perturbed values 428, and perturbing transaction parameter x2 by +/−$\Delta$ in the final two perturbed values 428. The perturbed values 428 may be input into the black box model 114 to analyze how each perturbation affects the risk score by analyzing the perturbed output 430. The perturbed output 430 compares the original risk score $y_i$ with the sum of the original risk score plus the change in the original risk score $\Delta y_i$ caused by the perturbed value 428 being analyzed by the black box model 114. The smaller the change in the original risk score $\Delta y_i$, the smaller the effect the perturbation of the perturbed transaction parameter has on the risk score in the instant environment of that outlier +1, +2. The larger the change in the original risk score $\Delta y_i$, the larger the effect the perturbation of the perturbed transaction parameter has on the risk score in the instant environment of that outlier +1, +2. The perturbation of the transaction parameter by a replacing a first category with a second category (e.g., replacing 'a' with 'b') may be performed for categorical transaction parameters. As shown in FIG. 5, the input values 426 may have a mixture of numerical and categorical transaction parameters, such that a combination of numerical transaction parameter perturbation techniques and categorical transaction parameter perturbation techniques may be used to perturb the input values 426.

Figure 6:
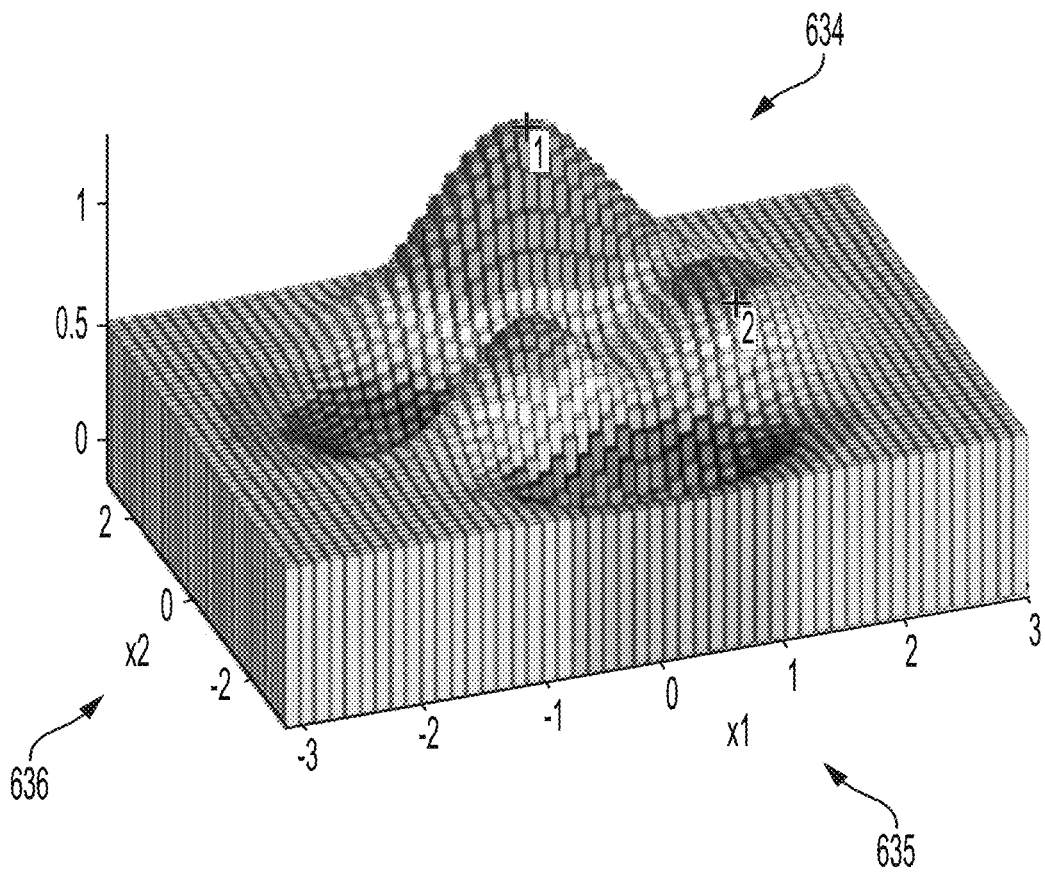
FIG. 6 shows a schematic diagram of a representation of a model gradient for several transaction parameters according to some non-limiting embodiments or aspects.

Referring to FIG. 6, a schematic diagram shows a representation of a model gradient 634 for several transaction parameters according to some non-limiting embodiments or aspects. The model gradient 634 may be a graphical representation of an output of the black box model 114 during perturbation of the transaction parameters. The model gradient 634 in this example shows the gradient for two transaction parameters 635, 636, although it will be appreciated that such a model gradient 634 may be generated for any number of transaction parameters. The axes x1 and x2 may represent the value of transaction parameters 635, 636, while the vertical axis may represent the value of the model output for a given value of the transaction parameters 635,

636. The model gradient 634 graphically illustrates the environment around the outliers +1, +2 with respect to the parameters 635, 636. For example, a steep gradient in a first direction of a first transaction parameter 635 may indicate that perturbing the first transaction parameter 635 in the first direction has a substantial impact on the model output, while a slight gradient in the first direction of the first transaction parameter 635 may indicate that perturbing the first transaction parameter 635 in the first direction has an insubstantial impact on the model output. The model gradient 634 may be generated using the black box model 114 by perturbing the transaction parameters and graphing the model output against the perturbations.

With continued reference to FIG. 6, the analysis may include comparing two transaction parameters 635, 636 to determine which transaction parameter may have a more substantial effect on the model output (e.g., determining which transaction parameter is more sensitive to perturbations). For example, for outlier +1 the gradient in the x2 direction appears to be steeper in the vicinity of the outlier +1 compared to the gradient in the x1 direction in the vicinity of the outlier +1. Therefore, for this example, it can be concluded that transaction parameter 636 (represented by the x2 direction) is more sensitive and has a more substantial effect on the model output in the vicinity of the outlier +1 compared to transaction parameter 635 (represented by the x1 direction). Such comparison can be made for each transaction parameter to develop a ranking of transaction parameters in relation to their effect on the model output in the vicinity of outlier +1.

Figure 7:
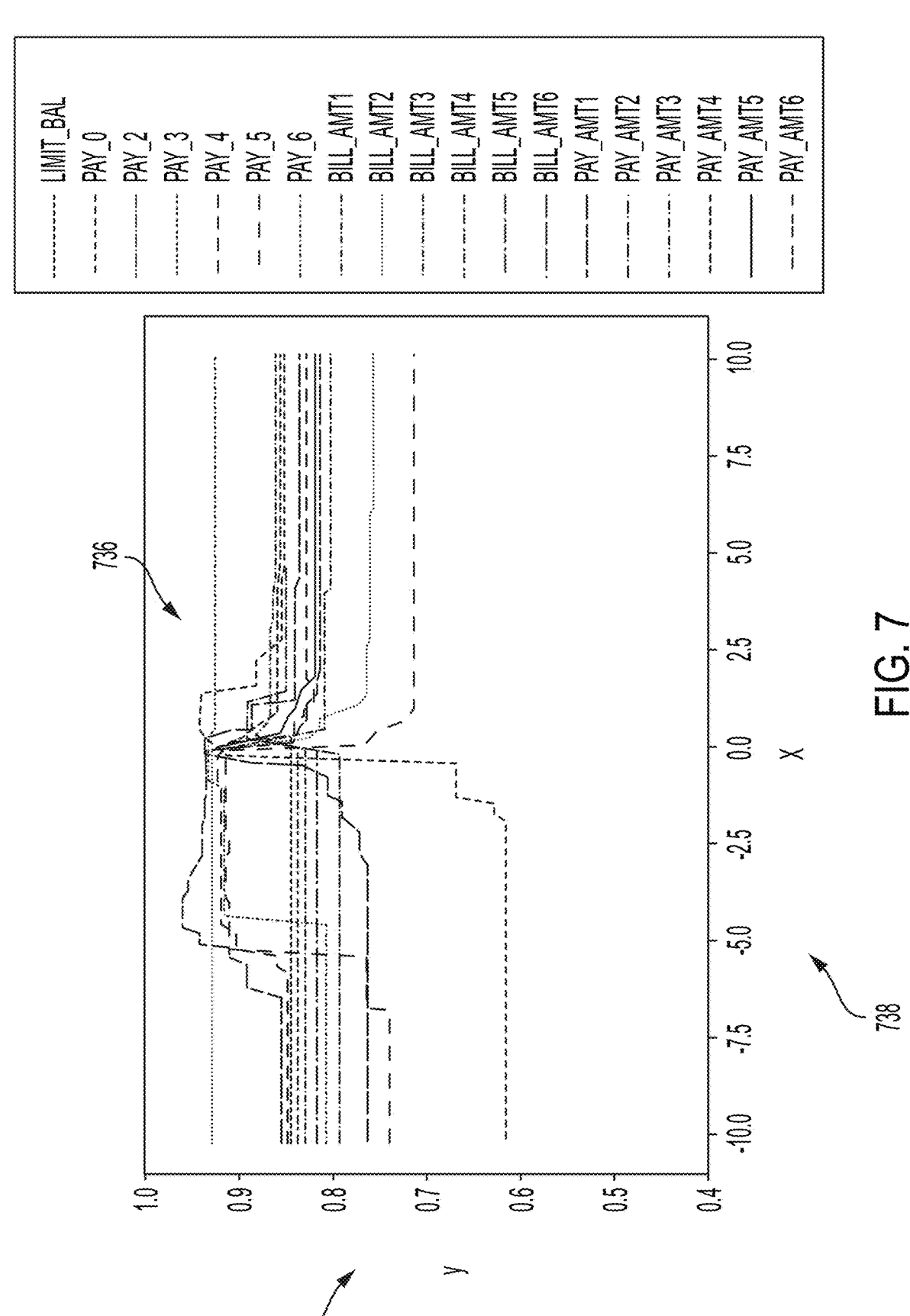
FIG. 7 shows a line graph of the effect of a perturbation of various transaction parameters based on the model output according to some non-limiting embodiments or aspects.

Referring to FIG. 7, a line graph 736 shows the effect of a perturbation of various transaction parameters based on the model output according to some non-limiting embodiments or aspects. The line graph 736 shows the change in model output perturbations 740 based on input parameter perturbations 738 for a plurality of transaction parameters. In the line graph 736, each different style of line represents a different transaction parameter, as illustrated by the key provided therewith. Each input parameter perturbation 738 is performed by perturbing one transaction parameter at a time. The line graph 736 may be generated using the black box model 114 by perturbing the transaction parameters individually and graphing the model output against the perturbations for each transaction parameter. The lines of the line graph 736 may be compared to one another to analyze which transaction parameter(s) have a more substantial impact on the outlier +1.

Figure 8:
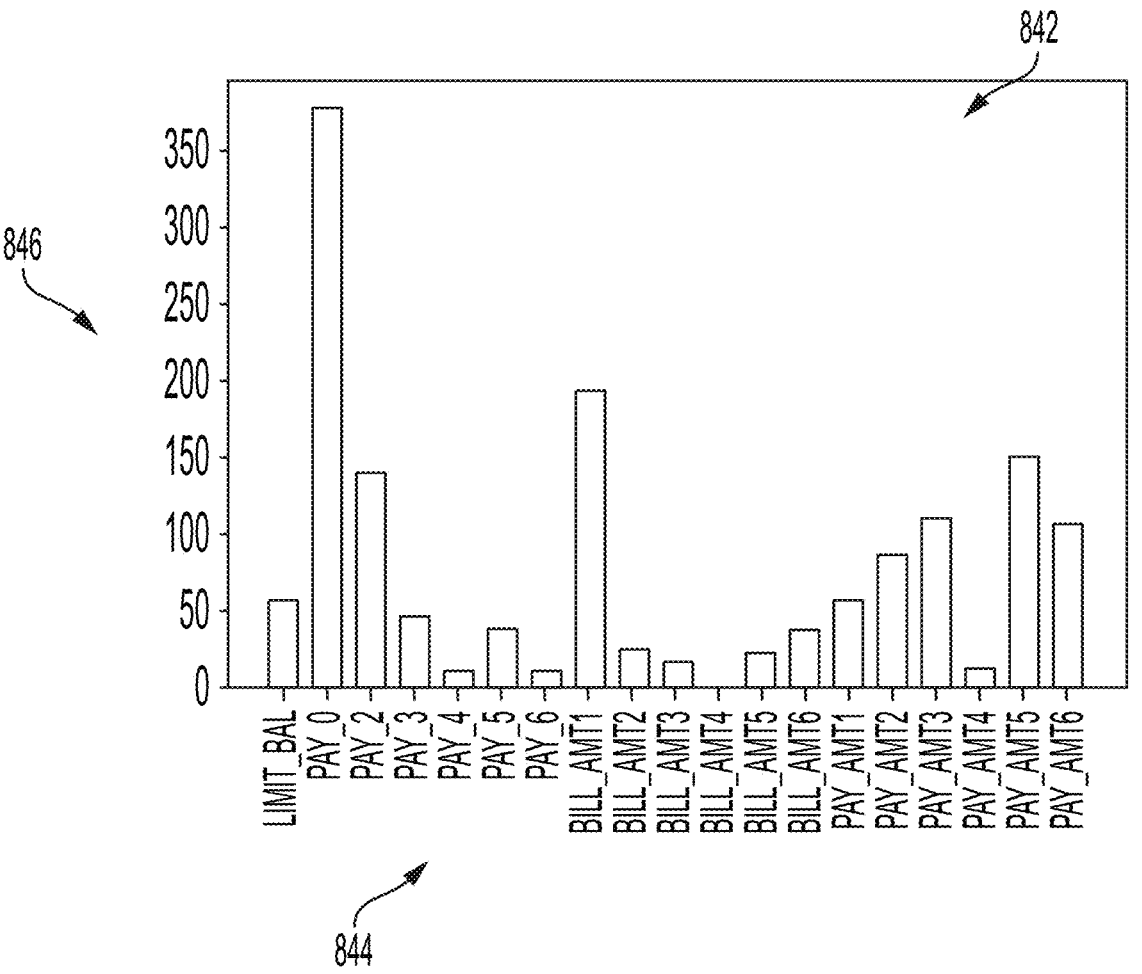
FIG. 8 shows a bar graph of the sensitivity of the model to perturbations of various transaction parameters according to some non-limiting embodiments or aspects.

Referring to FIG. 8, a bar graph 842 shows of the sensitivity of the model to perturbations of various transaction parameters according to some non-limiting embodiments or aspects. The bar graph 842 shows the various transaction parameters 844 (along the x-axis) and the parameter impact 846 (along the y-axis) for each of the transaction parameters 844. The parameter impact 846 may quantify the impact of each of the transaction parameters 844 on the model output so that the transaction parameters 844 may be directly compared. In some non-limiting examples, the parameter impact 846 may be quantified by comparing the change in the model output at a specific level of perturbation (e.g., by perturbing each transaction parameter by 5%). In other non-limiting examples, the parameter impact 846 may be quantified as a composite of a plurality of perturbations performed for each transaction parameter 844.

With continued reference to FIG. 8, in some non-limiting embodiments or aspects, the at least one impact parameter may be determined, for example by the model interpretation network 106, based on the data shown in the bar graph 842 comparing the parameter impact 846 of each transaction parameter 844. For example, the at least one impact parameter may be the transaction parameter 844 having the highest parameter impact 846 value (e.g., Pay_0). For example, the at least one impact parameter may be the transaction parameters 844 having the highest parameter impact 846 values, such as the top 3 or top 5. For example, the at least one impact parameter may be any transaction parameter satisfying a threshold parameter impact 846 value.

Figure 9:
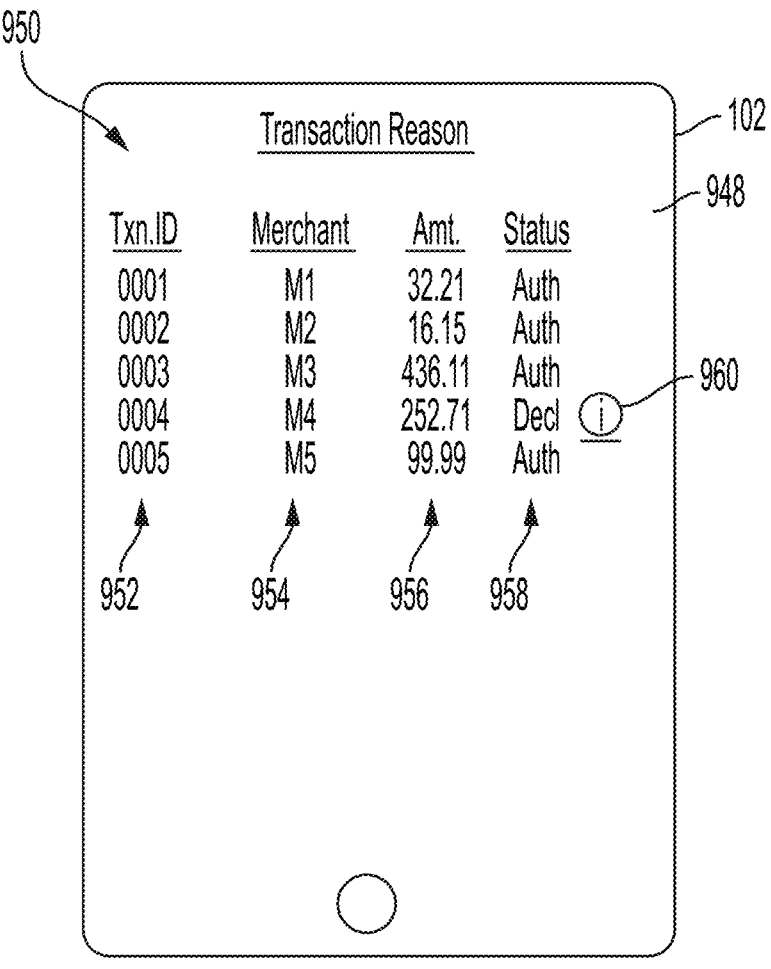
FIG. 9 shows a schematic diagram of a user device having a user interface enabling an inquiry request for declined transactions according to some non-limiting embodiments or aspects.

Referring to FIG. 9, a user device 102 is shown having a user interface 948 enabling an inquiry request be generated for declined transactions according to some non-limiting embodiments or aspects. The user interface 948 may display transaction history data 950 associated with payment transactions initiated by the user of the user device 102. The transaction history data 950 may include, for example, a transaction identifier 952, a merchant identifier 954, a transaction amount 956, and an authorization status 958. The transaction identifier 952 may comprise a unique identifier that identifies the subject transaction from any other transaction. The merchant identifier 954 may identify the merchant engaged in the subject transaction. The transaction amount 956 may specify the amount exchanged (or intended to be exchanged) between the user and merchant of the subject transaction. The authorization status 958 may identify whether the transaction was authorized or declined.

With continued reference to FIG. 9, the user interface 948 may also display a selectable element 960 next to outlier transactions, such as transactions which have a declined authorization status 958. It will be appreciated that authorization status 958 could be replaced by a fraud status indicating whether the transaction is fraudulent or not fraudulent or by a risk score showing the risk score assigned to the transactions, or these additional types of data may be added to the user interface 948 in addition to the authorization status 958. The selectable element 960 may be displayed next to outlier transactions in order for a user to request further data as to why the transaction was classified by the black box model 114 as an outlier. User selection of the selectable element 960 may automatically cause generation and transmission of an inquiry request message associated with the outlier payment transaction.

Figure 10:
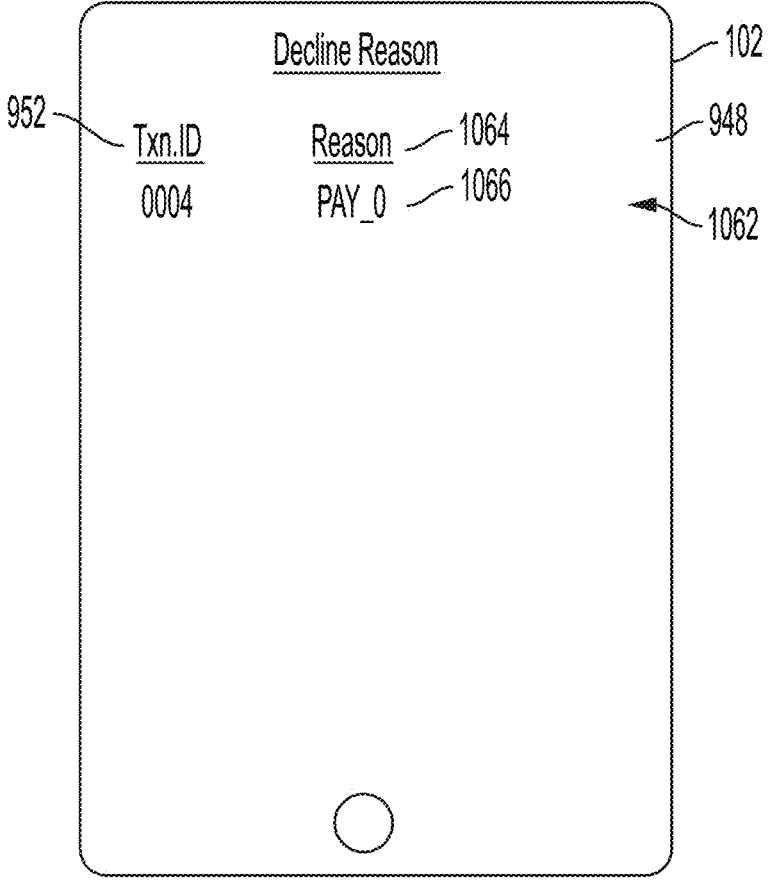
FIG. 10 shows a schematic diagram of a user device having a user interface displaying an inquiry response message according to some non-limiting embodiments or aspects.

Referring to FIG. 10, a user device 102 is shown having the user interface 948 displaying an inquiry response message 1062 according to some non-limiting embodiments or aspects. The user interface 948 may display a decline reason 1064 which comprises an impact parameter 1066 identified as a transaction parameter having a substantial impact on the classification of the transaction as an outlier. It will be appreciated that the impact parameter may additionally or alternatively be identified as a substantial transaction parameter for identifying the transaction as being fraudulent or having a risk score having an outlier value. It will be appreciated that a plurality of impact parameters 1066 may be identified as having a substantial impact in the classification of the transaction as an outlier.

Figure 11:
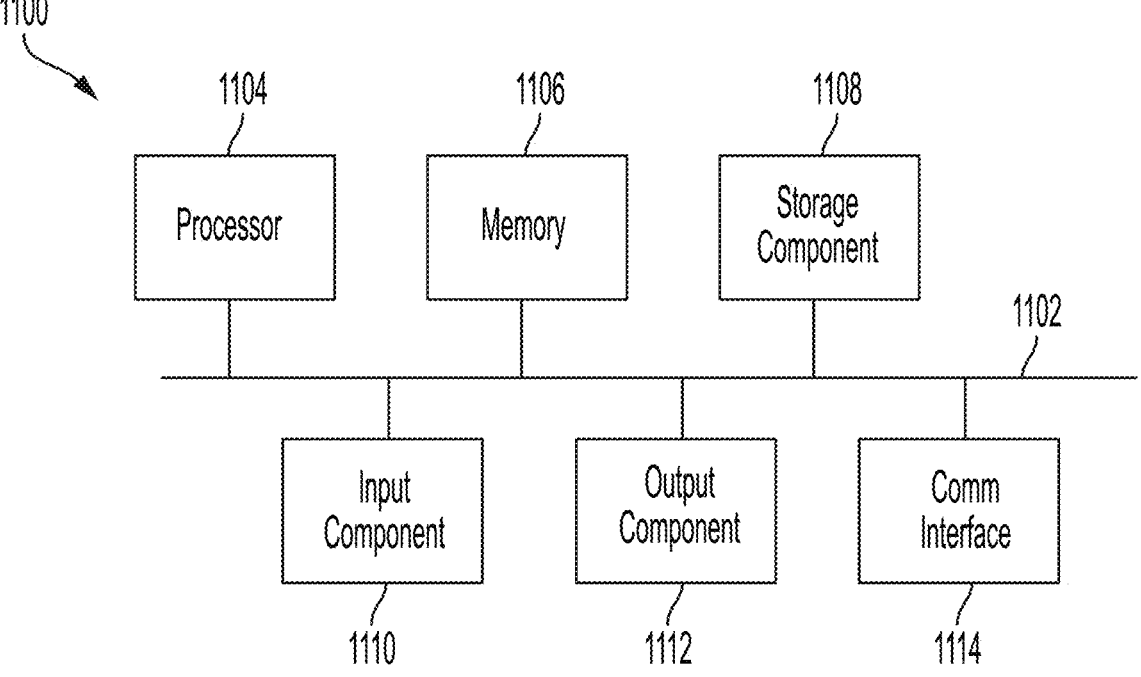
FIG. 11 illustrates example components of a device used in connection with non-limiting embodiments or aspects.

Referring to FIG. 11, shown is a diagram of example components of a device 1100 according to non-limiting embodiments or aspects. For example, device 1100 may correspond to any of the user device 102, electronic payment processing network 104, model interpretation network 106, merchant system 108, transaction processing system 110, issuer system 112, black box model 114, MIN processor 116, perturbation processor 118, or parameter analysis platform 120, shown in FIG. 1. In some non-limiting embodiments or aspects, such systems or devices may include at least one device 1100 and/or at least one component of device 1100.

The number and arrangement of components shown are provided as an example. In some non-limiting embodiments or aspects, device 1100 may include additional components, fewer components, different components, or differently arranged components than those shown in FIG. 11. Additionally, or alternatively, a set of components (e.g., one or more components) of device 1100 may perform one or more functions described as being performed by another set of components of device 1100.

As shown in FIG. 11, device 1100 may include a bus 1102, a processor 1104, memory 1106, a storage component 1108, an input component 1110, an output component 1112, and a communication interface 1114. Bus 1102 may include a component that permits communication among the components of device 1100. In some non-limiting embodiments or aspects, processor 1104 may be implemented in hardware, firmware, or a combination of hardware and software. For example, processor 1104 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 1106 may include random access memory (RAM), read only memory (ROM), and/or another type of dynamic or static storage device (e.g., flash memory, magnetic memory, optical memory, etc.) that stores information and/or instructions for use by processor 1104.

With continued reference to FIG. 11, storage component 1108 may store information and/or software related to the operation and use of device 1100. For example, storage component 1108 may include a hard disk (e.g., a magnetic disk, an optical disk, a magneto-optic disk, a solid state disk, etc.) and/or another type of computer-readable medium. Input component 1110 may include a component that permits device 1100 to receive information, such as via user input (e.g., a touch screen display, a keyboard, a keypad, a mouse, a button, a switch, a microphone, etc.). Additionally, or alternatively, input component 1110 may include a sensor for sensing information (e.g., a global positioning system (GPS) component, an accelerometer, a gyroscope, an actuator, etc.). Output component 1112 may include a component that provides output information from device 1100 (e.g., a display, a speaker, one or more light-emitting diodes (LEDs), etc.). Communication interface 1114 may include a transceiver-like component (e.g., a transceiver, a separate receiver and transmitter, etc.) that enables device 1100 to communicate with other devices, such as via a wired connection, a wireless connection, or a combination of wired and wireless connections. Communication interface 1114 may permit device 1100 to receive information from another device and/or provide information to another device. For example, communication interface 1114 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 1100 may perform one or more processes described herein. Device 1100 may perform these processes based on processor 1104 executing software instructions stored by a computer-readable medium, such as memory 1106 and/or storage component 1108. A computer-readable medium may include any non-transitory memory device. A memory device includes memory space located inside of a single physical storage device or memory space spread across multiple physical storage devices. Software instructions may be read into memory 1106 and/or storage component 1108 from another computer-readable medium or from another device via communication interface 1114. When executed, software instructions stored in memory 1106 and/or storage component 1108 may cause processor 1104 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method comprising:

training, with a transaction processing system, a machine-learning model of the transaction processing system on historical authorization decisions of a first issuer system, the transaction processing system different from the first issuer system;

receiving, with the transaction processing system, a transaction request associated with a payment transaction initiated by a payment device of a user, the payment transaction between the user and a first merchant system, the payment transaction comprising a plurality of transaction parameters;

generating, with the transaction processing system, an authorization request associated with the payment transaction;

communicating, with the transaction processing system, the authorization request to the first issuer system that issued the payment device;

determining, with the transaction processing system, that the first issuer system failed to return an authorization decision in response to the authorization request, wherein the first issuer system failed to return the authorization decision due to the first issuer system being at least temporarily unable to communicate with the transaction processing system;

in response to determining that the first issuer system failed to return the authorization decision, automatically generating, with the machine-learning model, a first risk score by inputting the plurality of transaction parameters of the payment transaction to the machine-learning model, the machine-learning model programmed or configured to generate the risk score without providing at least one interpretable reason for the risk score;

based on the risk score, generating, with the transaction processing system, a decline decision as the authorization decision, the decline decision generated on behalf of the first issuer system;

receiving, with a model interpretation network, an inquiry request message identifying the payment transaction;

inputting, to the model interpretation network, the plurality of transaction parameters of the payment transaction;

for each transaction parameter of the plurality of transaction parameters of the payment transaction, perturbing, with the model interpretation network, a value of the transaction parameter and reanalyzing the payment transaction with the machine-learning model to generate a perturbed risk score based on the perturbed transaction parameter;

determining, with the model interpretation network, at least one impact parameter from the plurality of transaction parameters by comparing the perturbed risk scores generated for each of the plurality of transaction parameters;

generating, with the model interpretation network, an inquiry response message based on the at least one impact parameter, the inquiry response message comprising at least one interpretable reason for the decline decision associated with the determined at least one impact parameter;

based on the at least one interpretable reason for the decline decision, determining that the decline decision was based on an error of the machine-learning model; and modifying the machine-learning model to remedy the error, the modified machine-learning model used for making authorization decisions for future payment transactions associated with the first issuer system.

2. The method of claim 1, wherein perturbing the value of the transaction parameter comprises perturbing, with the model interpretation network, a value of the transaction parameter based on the plurality of transaction parameters of the first transaction without input from other payment transactions.

3. The method of claim 1, wherein the perturbing comprises iteratively perturbing a single transaction parameter of the plurality of transaction parameters at a time, wherein each iteration generates a set of perturbed transaction parameters which comprises the plurality of transaction parameters with one parameter perturbed.

4. The method of claim 1, wherein a first transaction parameter of the plurality of transaction parameters comprises a numerical transaction parameter, wherein perturbing a value of the first transaction parameter comprises incrementing the value of the first transaction parameter by an amount and/or a percent of the value.

5. The method of claim 1, wherein a first transaction parameter of the plurality of transaction parameters comprises a categorical transaction parameter, wherein perturbing a value of the first transaction parameter comprises changing a category of the first transaction parameter from a first category to a second category.

6. The method of claim 1, wherein the machine-learning model is further trained using historical transaction data of the user.

7. The method of claim 1, wherein the first issuer system failed to return the authorization decision based on a lost connection between the first issuer system and a component of an electronic payment processing network.

8. A system comprising a transaction processing system programmed or configured to:

train a machine-learning model of the transaction processing system on historical authorization decisions of a first issuer system, the transaction processing system different from the first issuer system;

receive a transaction request associated with a payment transaction initiated by a payment device of a user, the payment transaction between the user and a first merchant system, the payment transaction comprising a plurality of transaction parameters;

generate an authorization request associated with the payment transaction;

communicate the authorization request to the first issuer system that issued the payment device;

determine that the first issuer system failed to return an authorization decision in response to the authorization request, wherein the first issuer system failed to return the authorization decision due to the first issuer system being at least temporarily unable to communicate with the transaction processing system;

in response to determining that the first issuer system failed to return the authorization decision, automatically generate, with the machine-learning model, a first risk score by inputting the plurality of transaction parameters of the payment transaction to the machine-learning model, the machine-learning model programmed or configured to generate the risk score without providing at least one interpretable reason for the risk score;

based on the risk score, generate a decline decision as the authorization decision, the decline decision generated on behalf of the first issuer system;

the system further comprising a model interpretation network programmed or configured to:

receive an inquiry request message identifying the payment transaction;

input, to the model interpretation network, the plurality of transaction parameters of the payment transaction;

for each transaction parameter of the plurality of transaction parameters of the payment transaction, perturb, with the model interpretation network, a value of the transaction parameter and reanalyze the payment transaction with the machine-learning model to generate a perturbed risk score based on the perturbed transaction parameter;

determine at least one impact parameter from the plurality of transaction parameters by comparing the perturbed risk scores generated for each of the plurality of transaction parameters; and generate an inquiry response message based on the at least one impact parameter, the inquiry response message comprising at least one interpretable reason for the decline decision associated with the determined at least one impact parameter;

the system further configured to:

based on the at least one interpretable reason for the decline decision, determine that the decline decision was based on an error of the machine-learning model; and modify the machine-learning model to remedy the error, the modified machine-learning model used for making authorization decisions for future payment transactions associated with the first issuer system.

9. The system of claim 8, wherein perturbing the value of the transaction parameter comprises perturbing, with the model interpretation network, a value of the transaction parameter based on the plurality of transaction parameters of the first transaction without input from other payment transactions.

10. The system of claim 8, wherein the perturbing comprises iteratively perturbing a single transaction parameter of the plurality of transaction parameters at a time, wherein each iteration generates a set of perturbed transaction parameters which comprises the plurality of transaction parameters with one parameter perturbed.

11. The system of claim 8, wherein a first transaction parameter of the plurality of transaction parameters comprises a numerical transaction parameter, wherein perturbing a value of the first transaction parameter comprises incrementing the value of the first transaction parameter by an amount and/or a percent of the value.

12. The system of claim 8, wherein a first transaction parameter of the plurality of transaction parameters comprises a categorical transaction parameter, wherein perturbing a value of the first transaction parameter comprises changing a category of the first transaction parameter from a first category to a second category.

13. The system of claim 8, wherein the machine-learning model is further trained using historical transaction data of the user.

14. The system of claim 8, wherein the first issuer system failed to return the authorization decision based on a lost connection between the first issuer system and a component of an electronic payment processing network.

15. A computer program product comprising at least one non-transitory computer-readable medium including program instructions that, when executed by at least one processor, cause the at least one processor comprising a transaction processing system and/or a model interpretation network to:

train a machine-learning model of the transaction processing system on historical authorization decisions of a first issuer system, the transaction processing system different from the first issuer system;

receive a transaction request associated with a payment transaction initiated by a payment device of a user, the payment transaction between the user and a first merchant system, the payment transaction comprising a plurality of transaction parameters;

generate an authorization request associated with the payment transaction;

communicate the authorization request to the first issuer system that issued the payment device;

determine that the first issuer system failed to return an authorization decision in response to the authorization request, wherein the first issuer system failed to return the authorization decision due to the first issuer system being at least temporarily unable to communicate with the transaction processing system;

in response to determining that the first issuer system failed to return the authorization decision, automatically generate, with the machine-learning model, a first risk score by inputting the plurality of transaction parameters of the payment transaction to the machine-learning model, the machine-learning model programmed or configured to generate the risk score without providing at least one interpretable reason for the risk score;

based on the risk score, generate a decline decision as the authorization decision, the decline decision generated on behalf of the first issuer system;

receive an inquiry request message identifying the payment transaction;

input, to the model interpretation network, the plurality of transaction parameters of the payment transaction;

for each transaction parameter of the plurality of transaction parameters of the payment transaction, perturb, with the model interpretation network, a value of the transaction parameter and reanalyze the payment transaction with the machine-learning model to generate a perturbed risk score based on the perturbed transaction parameter;

determine at least one impact parameter from the plurality of transaction parameters by comparing the perturbed risk scores generated for each of the plurality of transaction parameters;

generate an inquiry response message based on the at least one impact parameter, the inquiry response message comprising at least one interpretable reason for the decline decision associated with the determined at least one impact parameter;

based on the at least one interpretable reason for the decline decision, determine that the decline decision was based on an error of the machine-learning model; and modify the machine-learning model to remedy the error, the modified machine-learning model used for making authorization decisions for future payment transactions associated with the first issuer system.

16. The computer program product of claim 15, wherein perturbing the value of the transaction parameter comprises perturbing, with the model interpretation network, a value of the transaction parameter based on the plurality of transaction parameters of the first transaction without input from other payment transactions.

17. The computer program product of claim 15, wherein the perturbing comprises iteratively perturbing a single transaction parameter of the plurality of transaction parameters at a time, wherein each iteration generates a set of perturbed transaction parameters which comprises the plurality of transaction parameters with one parameter perturbed.

18. The computer program product of claim 15, wherein a first transaction parameter of the plurality of transaction parameters comprises a numerical transaction parameter, wherein perturbing a value of the first transaction parameter comprises incrementing the value of the first transaction parameter by an amount and/or a percent of the value.

19. The computer program product of claim 15, wherein a first transaction parameter of the plurality of transaction parameters comprises a categorical transaction parameter, wherein perturbing a value of the first transaction parameter comprises changing a category of the first transaction parameter from a first category to a second category.

20. The computer program product of claim 15, wherein the machine-learning model is further trained using historical transaction data of the user.

* * * * *